US011053872B2

(12) United States Patent
Dixon et al.

(10) Patent No.: US 11,053,872 B2
(45) Date of Patent: Jul. 6, 2021

(54) METHOD AND SYSTEM FOR OPERATING AN ENGINE

(71) Applicant: Ford Global Technologies, LLC, Dearborn, MI (US)

(72) Inventors: Jon Dixon, Maldon (GB); Ian Halleron, Chelmsford (GB); Andres Arevalo, London (GB)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/844,830

(22) Filed: Apr. 9, 2020

(65) Prior Publication Data
US 2020/0232402 A1    Jul. 23, 2020

Related U.S. Application Data

(62) Division of application No. 15/593,133, filed on May 11, 2017, now Pat. No. 10,677,179.

(30) Foreign Application Priority Data

May 18, 2016  (GB) ..................................... 1608717
May 18, 2016  (IN) .............................. 201641017210

(51) Int. Cl.
*F02D 41/00* (2006.01)
*F02D 41/10* (2006.01)
(Continued)

(52) U.S. Cl.
CPC .......... *F02D 41/0072* (2013.01); *F02B 37/24* (2013.01); *F02D 41/0007* (2013.01);
(Continued)

(58) Field of Classification Search
CPC .. F02D 41/0072; F02D 41/10; F02D 41/0007; F02D 41/1448; F02D 41/0052;
(Continued)

(56) References Cited

U.S. PATENT DOCUMENTS 4,452,217 A   6/1984  Kawamura et al.
6,067,800 A   5/2000  Kolmanovsky et al.
(Continued)

FOREIGN PATENT DOCUMENTS

DE      19835145 A1    2/2000
DE    102008063935 A1    6/2010
(Continued)

OTHER PUBLICATIONS

Intellectual Property Office of Great Britain, Combined Search and Examination Report Issued in Application No. GB1608717.3, dated Nov. 11, 2016, South Wales, 8 pages.
(Continued)

*Primary Examiner* — Audrey K Bradley
*Assistant Examiner* — Edward Bushard
(74) *Attorney, Agent, or Firm* — Geoffrey Brumbaugh; McCoy Russell LLP

(57) ABSTRACT

Methods and systems are provided for coordinating operation of a high pressure EGR control loop with a boost pressure control loop. In one example, following a tip-in, turbine vane position may be adjusted as a function of a maximum permissible exhaust pressure upstream of a turbocharger turbine. The maximum permissible exhaust pressure may be determined as a function of a HP EGR valve position at the time of the tip-in.

20 Claims, 4 Drawing Sheets

(51) Int. Cl.
*F02D 41/14* (2006.01)
*F02M 26/05* (2016.01)
*F02B 37/24* (2006.01)

(52) U.S. Cl.
CPC ......... *F02D 41/10* (2013.01); *F02D 41/1448* (2013.01); *F02M 26/05* (2016.02); *F02D 41/0052* (2013.01); *F02D 2200/0406* (2013.01); *Y02T 10/12* (2013.01)

(58) Field of Classification Search
CPC ............. F02D 2200/0406; F02D 37/00; F02D 2200/1002; F02M 26/05; F02B 37/24; F02B 37/183; Y02T 10/12
See application file for complete search history.

(56) References Cited

U.S. PATENT DOCUMENTS

| | | | |
|---|---|---|---|
| 6,716,767 | B2 | 4/2004 | Caddy |
| 7,593,828 | B2 | 9/2009 | Wang et al. |
| 8,387,370 | B2 | 3/2013 | Van Nieuwstadt et al. |
| 9,909,490 | B2 | 3/2018 | Hand, III et al. |
| 9,915,197 | B2 * | 3/2018 | Cattani .................. F02D 41/10 |
| 2001/0032466 | A1 | 10/2001 | Waszkiewicz et al. |
| 2003/0010019 | A1 | 1/2003 | Engel et al. |
| 2008/0148729 | A1 | 6/2008 | Endo |
| 2010/0282222 | A1 | 11/2010 | Ide et al. |
| 2013/0025575 | A1 | 1/2013 | Vitiello et al. |
| 2013/0212253 | A1 | 8/2013 | Aho et al. |
| 2015/0337720 | A1 | 11/2015 | Cattani et al. |
| 2016/0131089 | A1 | 5/2016 | Lahti et al. |

FOREIGN PATENT DOCUMENTS

| | | |
|---|---|---|
| EP | 0984153 A2 | 3/2000 |
| EP | 1024272 A1 | 8/2000 |
| EP | 1178192 A2 | 2/2002 |
| EP | 1767760 A2 | 3/2007 |
| EP | 2772629 A1 | 9/2014 |
| FR | 3021702 A1 | 12/2015 |
| GB | 2493748 A | 2/2013 |
| WO | 2004027235 A1 | 4/2004 |

OTHER PUBLICATIONS

European Patent Office, Extended European Search Report Issued in Application No. 17168389.9, dated Oct. 9, 2017, Germany, 9 pages.

* cited by examiner

METHOD AND SYSTEM FOR OPERATING AN ENGINE

CROSS REFERENCE TO RELATED APPLICATIONS

The present application is a divisional of U.S. Non-Provisional patent application Ser. No. 15/593,133, entitled "METHODS AND SYSTEMS FOR OPERATING AN ENGINE," filed on May 11, 2017. U.S. patent application Ser. No. 15/593,133 claims priority to Great Britain Patent Application No. 1608717.3, filed on May 18, 2016, and to Indian Patent Application No. 201641017210, filed May 18, 2016. The entire contents of the above-referenced applications are hereby incorporated by reference in their entirety for all purposes.

FIELD

The present description relates generally to methods and systems for controlling a vehicle engine to improve responsiveness of the engine assembly to control inputs.

BACKGROUND/SUMMARY

Engines for vehicles, e.g. motor vehicles, often comprise a turbocharger comprising a compressor configured to increase the pressure of inlet air entering the engine, and hence, the amount of fuel that may be combusted within the engine to provide torque to drive the vehicle. The compressor is driven by an exhaust turbine. The turbocharger responds to requests from a driver of the vehicle for increased torque to be supplied by the engine. A boost control loop controls the turbocharger to provide the required boost in the intake manifold, thereby controlling the mass of gas entering the engine. In this way, the boost loop improves engine performance and a driving experience of the driver.

Engines are also often provided with Exhaust Gas Recirculation (EGR) systems configured to recirculate a portion of the burnt exhaust gases to an inlet of the engine. Replacing a portion of the oxygen rich inlet air with burnt exhaust gases reduces the proportion of the contents of each cylinder that is available for combustion. This results in a lower heat release and lower peak cylinder temperature and thereby reduces the formation of NOX, improving the emissions performance of the vehicle. An EGR control loop of the engine controls flow of exhaust gases from the exhaust manifold to the intake manifold. In boosted engines, the EGR system may include a high pressure EGR line for recirculating exhaust gases from upstream of the turbine to downstream of the compressor, and a low pressure EGR line for recirculating exhaust gases from downstream of the turbine to upstream of the compressor.

The operation of the EGR and turbocharger systems is interrelated and hence careful control of both systems is required to provide the driver with a good response to a request for increased torque from the engine, whilst maintaining good emissions performance. In case an excess volume of exhaust gases is recirculated, the torque response of the engine may be poor, which may affect a driving experience. On the other hand, if insufficient amount of exhaust gases are recirculated, NOx emissions are increased. Further, with more stringent emissions control regulations, great reliance is placed on EGR for controlling emissions, while at the same time, customer demand for quick responding engines is also increasing. Such competing and conflicting requirements often result in compromising on one of the two gas control loops (viz. the boost loop and the EGR loop).

As an example, when the driver requests increased torque to be supplied from the engine, e.g. by pressing an accelerator pedal of the vehicle (also referred to as a tip-in), the operation of the turbocharger is controlled to increase boost pressure as quickly as possible. For example, vanes of the turbine may be moved to a more closed position in order to increase the inlet pressure to the engine. However, quick closing of the vanes results in an increase in exhaust manifold pressure, which in turn causes an increase in pressure drop across the EGR line. Further, increase in the pressure drop leads to an increase in an EGR flow, if a position of an EGR valve of the EGR line remains constant. Consequently, an amount of fresh charge in the intake manifold may reduce. The engine may therefore provide an inadequate response to the request for increased torque. Thus, instead of having an increased torque production, torque production may be decreased, which may negatively impact the boost loop and thus, the driving experience.

One example approach for controlling boost pressure in an internal combustion engine is described in EP patent application 1178192 ('192 application). Therein vanes of a turbine of the engine are adjusted to control boost pressure in an intake passage. In particular, the vanes are adjusted based on engine operating conditions such as engine speed, fuel and oil consumption, water temperature, boost pressure, atmospheric pressure, atmospheric temperature, and a position of the EGR valve.

However, the inventors herein have recognized potential issues with such systems. As one example, the '192 application describes vane adjustments for controlling a pressure downstream of the turbine, based on multiple parameters. As such, the approach of the 192 application may not be able to control a pressure upstream of the turbine. As another example, the '192 application provides a static mechanism for controlling the vane positions, which may not adequately optimize the EGR loop and the boost loop in cases where fast response may be required.

In one example, the issues described above may be addressed by a method for a turbocharged engine comprising: estimating a maximum allowable rate of increase of exhaust manifold (EM) pressure based on a position of an exhaust gas recirculation (EGR) valve; estimating a maximum allowable EM pressure based on the maximum allowable rate of increase of EM pressure; and adjusting a vane position of an exhaust turbine based on the maximum allowable EM pressure. In this way, EGR and boost pressure control may be better coordinated for a fast torque response. In particular, the method enables maintaining of an exhaust manifold (EM) pressure of an engine.

As one example implementation, a turbocharged engine may be operating with high pressure EGR and boost enabled. At each time step of boosted engine operation, or responsive to an operator torque demand, an engine controller may determine an exhaust manifold (EM) pressure, that is, a pressure of exhaust gases upstream of a turbine of the turbocharger. The pressure of exhaust gases upstream of the turbine may be determined by referring to a data model or look-up table.

The controller may further determine a maximum permitted rate of increase of EM pressure based on a position of an exhaust gas recirculation (EGR) valve. The maximum permitted rate of increase may correspond to a maximum allowable rate for a given position of the EGR valve. Further, at each time step, a maximum allowable EM pressure may be determined based on the rate of increase of the EM pressure. The maximum allowable pressure is indicative of an EM pressure to maintain a mass flow of recirculated exhaust gas within a permissible limit. In one example, the maximum permitted value of pressure may be determined by multiplying the maximum permitted rate of increase in pressure by a particular period of time, for example, the length of the time step over which the method is performed, to calculate a maximum permitted increase in pressure; and then adding the maximum permitted increase to the determined pressure of exhaust gases upstream of the turbine.

Then, based on the maximum allowable EM pressure, at the each time step, operation of the turbocharger may be controller at least partially according to the pressure of the exhaust gases upstream of the turbine, such that the rate of increase in pressure of the exhaust gases is maintained at or below the maximum permitted rate. In one example, the turbocharger may comprise a Variable Geometry Turbine (VGT), wherein operation of the turbocharger assembly may be controlled by varying the geometry of the VGT. For example, a position of a vane of a turbine of the internal combustion engine may be controlled so that the EM pressure is maintained at or below the maximum allowable EM pressure and/or the maximum permitted rate of increase in EM pressure. Additionally or alternatively, the turbocharger may comprise a turbocharger assembly bypass duct, configured to permit exhaust gases to bypass a turbocharger assembly of the turbocharger assembly. For example, the bypass duct may allow exhaust gases to bypass the turbine of the turbocharger assembly. Therein, operation of the turbocharger assembly may be controlled by varying the flow of exhaust gases through the bypass duct by varying a position of a bypass valve in the bypass duct. Herein, the maximum allowable EM pressure and/or the maximum permitted rate of increase in EM pressure may be determined at least partially according to the position of the EGR valve. The controller may further determine a mass flow rate of exhaust gases through the turbine. The operation of the turbocharger may be controlled at least partially according to the mass flow rate of exhaust gases through the turbine.

As another example, the controller may control a degree of closing and/or a speed of closing of a vane of the turbine, based on the maximum allowable EM pressure, to optimize the EGR loop and the boost loop of the internal combustion engine. For example, the speed of closing the vanes of the turbines may be controlled by controlling vane positions.

In one example, to control the turbine vane position, a position of the vane may be determined based on an inverted turbine model. The inverted turbine model may provide the vane position as a function of the maximum allowable EM pressure, exhaust pressure downstream the turbine, and a rate of mass flow of the exhaust gases in the turbine. Further, the determined vane position may be compared with a default value of the vane position. The default value refers to a value of the vane position which is determined independent of the maximum allowable pressure. Based on the comparison, a minimum of the two values may be ascertained and used as a final value of the vane position.

The method may be performed iteratively over a plurality of time steps, as an example. Each step of the method may be performed during each time step. Alternatively, one or more of the steps may be omitted when being performed within the iterative process. Iteration of the steps of the method may be continued until a predetermined period of time has elapsed. In another example, the controller may detect a request for an increased amount of torque to be supplied by the engine, e.g. from a driver or controller of the vehicle. The method may be performed iteratively over the plurality of time steps responsive to detection of the request for increased torque.

The controller may further vary the position of the EGR valve such that the flow rate of exhaust gases within the EGR duct remains substantially constant. The operation of the turbocharger may be controlled such that the position of the EGR valve may be varied to maintain the flow rate of exhaust gases within the EGR duct at a substantially constant value.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Engines equipped with exhaust gas recirculation (EGR) generally have two gas control loops, namely a boost loop and an EGR loop. The two loops have significant interaction where something which may increase performance of one loop may negatively impact the other. For instance, in case of sudden increase in torque requirements, if the EGR loop does not respond to an increase in exhaust manifold pressure sufficiently quickly, the mass flow of the EGR may be beyond a desired level. Further, if the changes to the exhaust manifold pressure are sudden, the EGR loop may not be able to adequately mitigate the effects, leading to excess burned gas in an intake system resulting loss of torque. An example engine system having EGR capabilities is described with reference to FIG. 1. An engine controller may be configured to perform a control routine, such as the example routine of FIG. 2, to coordinate engine EGR and boost control loops. Therein a VGT geometry may be adjusted to limit a maximum exhaust manifold pressure upstream of an exhaust turbine based on a position of a high pressure EGR valve, such as based on the relationship shown at FIG. 3. An example engine operation is shown with reference to FIG. 4.

Figure 1:
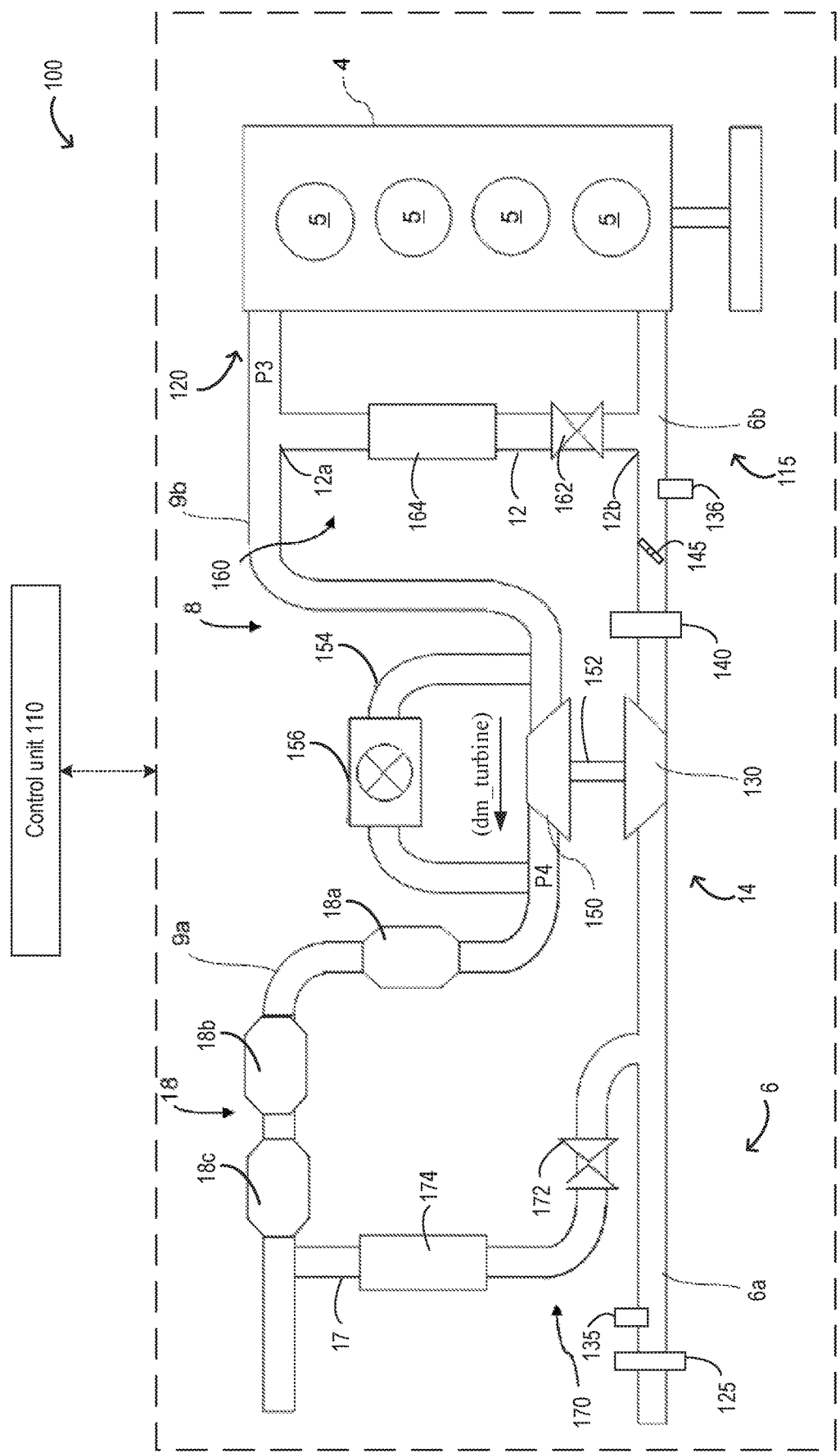
FIG. 1 is a schematic view of an engine assembly according to arrangements of the present disclosure.

With reference to FIG. 1, an engine assembly 100, according to an implementation of the present subject matter is shown. Engine assembly 100 may be coupled in a vehicle, e.g. a motor vehicle, which may be a hybrid vehicle. Engine assembly 100 includes an engine 4, an intake system 6, and an exhaust system 8. Engine 4 is communicatively coupled to a control unit 110, which may be configured as an engine control unit. Intake gases are mixed with fuel within the cylinders 5 of the engine 4 and the fuel is combusted to provide power to drive the engine 4.

Engine intake system includes an intake manifold 115 to receive air for combustion via intake passage 6a. Fresh air may be provided to the engine via the intake passage 6a through an air filter 125. The air filter 125 prevents abrasive matter and contaminants, such as pollutants, pollen, dust, and bacteria from entering engine cylinders 5. In proximity to the air filter 125, a mass flow sensor 135 may be provided to determine a mass flowrate of air entering the engine 4. The mass flow sensor 135 may be coupled to the control unit 110 to provide the determined mass flowrate to the control unit 110 for controlling engine operation. Intake of air to the intake manifold 115 may be regulated using an intake throttle 145. The throttle 145 may opened or closed to manage air flow. The pressure of the intake air, including the fresh air and the exhaust gases, entering the intake manifold 115 may be measured using a manifold air charge pressure sensor 136 which is also coupled to the control unit 110.

In the depicted example, the engine is a boosted engine system having a turbocharger assembly 14. The turbocharger assembly 14 includes an intake compressor 130 driven by an exhaust turbine 150 via a shaft 152. Intake air may be compressed using the compressor 130 to increase pressure and density of the air for better engine efficiency. Due to compression, a temperature of the intake air may increase. Therefore the compressed air may be cooled upon passage through a charge air cooler 140 to bring down the temperature of the air before being delivered to the engine to improve combustion.

The intake system 6 comprises a Low Pressure (LP) intake duct 6a provided upstream of compressor 130 of turbocharger assembly 14. The compressor 130 is configured to increase the pressure of inlet air arriving at the compressor 130 from the low pressure intake duct 6a to a boost pressure level. Inlet air that has been compressed by the compressor 130 enters a high pressure inlet duct 6b. Inlet gases flow within the HP inlet duct 6b to an inlet manifold 115 of the engine and may be drawn into cylinders 5 of the engine 4.

Exhaust system 8 further includes an exhaust manifold 120 to discharge exhaust gases upon combustion in the engine. The exhaust system 8 may further comprise one or more exhaust after-treatment devices 18 provided downstream of the turbine 150. For example, the exhaust system 8 may comprise a lean NOx trap 18a, a particulate filter 18b and/or a selective catalytic reduction device 18c. The exhaust after-treatment devices may be configured to reduce the concentrations of polluting substances present within the exhaust gases.

One or more of the exhaust after-treatment devices 18a, 18b, 18c may be controllable to adjust the efficiency with which they remove polluting substances from the exhaust gases. Controlling the operation of the exhaust after-treatment devices may affect the mass flow rate of exhaust gases through the exhaust system 8 and hence, through the turbine 150.

Additionally or alternatively, following a period of operation of the exhaust after-treatment devices 18, the performance of the devices 18 may be reduced. For example, the particulate filter 18b and/or the lean NOx trap 18a may become full, reducing the rate at which they are able to remove polluting substances from the exhaust gases. As the performance of the exhaust after-treatment devices reduces, the mass flow rate of exhaust gases through the exhaust after-treatment devices and/or the difference in pressure across the exhaust after-treatment devices may vary.

Engine system 100 further includes a High Pressure (HP) Exhaust Gas Recirculation (EGR) assembly 160 for recirculating exhaust gases from upstream of the turbine to downstream of the compressor. Engine system also includes a Low Pressure (LP) Exhaust Gas Recirculation (EGR) assembly 170 for recirculating exhaust gases from downstream of the turbine to upstream of the compressor.

Exhaust gases may flow through the HP exhaust duct 9b to the turbine 150 of the turbocharger assembly. The exhaust gases may be expanded through the turbine 150 to reach a low pressure exhaust duct 9a. Power may be generated by the turbine 150 by expanding the exhaust gases through the turbine 150, to power the compressor 130.

In the depicted example, turbine 150 is a Variable Geometry Turbine (VGT) comprising variable inlet vanes (not shown), which are arranged at an angle relative to a rotor (not shown) of the turbine. By varying the angle of the inlet vanes relative to the rotor, the power generated by the turbine 150, and hence, the power provided to the compressor 130 may be controlled. The level of boost provided by the turbocharger assembly 14 may therefore be controlled by varying the angle of the variable inlet vanes. In some arrangements, the geometry of the turbine 150 may be fixed.

A level of boost provided by the turbocharger assembly 14 may be additionally or optionally controlled by controlling exhaust flow through a turbocharger assembly bypass duct 154. Bypass duct 154 is configured to allow a portion of the exhaust gases to flow from the HP exhaust duct 9b to the LP exhaust duct 9a without passing through the turbine 150. The flow of exhaust gases passing through the turbine bypass duct 154 may be controlled by a bypass valve, also referred to as a waste-gate valve 156. By allowing a portion of the exhaust gasses to bypass the turbine 150, the power generated by turbine, and hence, the power available to drive the compressor 130 may be reduced. The level of boost provided by the turbocharger assembly 14 may therefore be reduced.

In arrangements where the exhaust system 8 comprises a VGT turbine and also comprises the turbocharger bypass duct 154 and bypass valve 156, the power generated by the turbine 150 may be controlled by varying the geometry of the turbine 150 and/or by varying the position of the bypass valve 156.

As mentioned above, increasing the pressure of inlet air entering the engine 4, e.g. the level of boost or boost pressure, allows a greater quantity of air to be drawn into the cylinders of the engine, which in turn allows more fuel to be mixed with the air and combusted. Burning more fuel within the engine 4 allows the engine to develop more power and torque to drive the vehicle. When a driver of the vehicle requests more power to be supplied by the engine 4, for example by pressing an accelerator pedal (not shown) of the vehicle, the turbocharger assembly 14 may be controlled to increase the level of boost provided by the turbocharger assembly, and hence, the power and torque generated by the engine.

HP EGR assembly 160 comprises an HP EGR duct 12 configured to recirculate a portion of the exhaust gases leaving the engine 4 back to the intake system 6. The recirculated exhaust gases mix with inlet air within the intake system 6 and may be drawn back into the engine 4 upon passage through an HP EGR cooler 164. A first end 12a of the HP EGR duct may be coupled to and in fluid communication with the HP exhaust duct 9b, e.g. a position on the exhaust system 8 upstream of the turbine 150. For example, the first end 12a of the HP EGR duct 12 may be coupled to the exhaust manifold 120. A second end 12b of the HP EGR duct 12 may be coupled to and in fluid communication with the HP intake duct 6b, e.g. at position on the intake system 6 downstream of the compressor 130.

The flow of exhaust gases within the HP EGR duct 12 may be controlled by an HP EGR valve 162. The flow rate of the exhaust gases may depend on the position of the HP EGR valve 162 and the pressure difference between the first and second ends 12a, 12b of the HP EGR duct 12. For example, when the pressure of exhaust gases within the HP exhaust duct 9b increases relative to the pressure of inlet gases within the HP inlet duct 6b, the flow rate of exhaust gases within the HP EGR duct 12 may increase for a given position of the HP EGR valve 162.

LP EGR assembly 170 comprises a LP EGR duct 17 configured to recirculate a portion of the exhaust gases leaving the engine 4 back to the intake system 6. The recirculated exhaust gases mix with inlet air within the intake system 6 and may be drawn back into the engine 4 upon passage through an LP EGR cooler 174. The flow of exhaust gases within the LP EGR duct 17 may be controlled by an LP EGR valve 172. The flow rate of the exhaust gases may depend on the position of the LP EGR valve 172 and the pressure difference between the ends of the LP EGR duct 17.

Increasing the flow rate of EGR gases, either due to a change in the position of the HP EGR valve or a change in the pressure difference across the HP EGR duct 12, may lead to a reduction in the quantity of inlet air present in the intake gases being drawn into the cylinders of the engine 4, thereby reducing the quantity of fuel which may be combusted within the engine. The power generated by the engine 4 may therefore be reduced. Controlling the power generated by the engine in this way may be beneficial, as it may lead to a reduction in the production of pollutants, such as nitrous oxides, compared to controlling the engine 4 in other ways, for example by using an inlet throttle.

As described above, when increased power or torque is requested by a driver of the vehicle, the operation of the turbocharger assembly 14 may be controlled to increase the level of boost provided. In one example, controlling the turbocharger assembly to increase the level of boost may be achieved by adjusting the angle of the variable vanes of the turbine 150. Adjusting the angle of the vanes may reduce the area through which exhaust gases passing through the turbine 150 may flow. Hence, following control of the turbine in this way, the pressure of the exhaust gases upstream of the turbine, e.g. within the exhaust manifold 120, may increase.

As another example, controlling the turbocharger assembly to increase the level of boost may be achieved by closing waste-gate valve 156. Closing the waste-gate valve may reduce the flow area available for exhaust gases to bypass the turbine 150, which may lead to an increase in the pressure of exhaust gases within the HP exhaust duct 9b and/or the exhaust manifold 120.

The increase in pressure of the exhaust gases upstream of the turbine 150, due to the change in flow area through and/or bypassing the turbine, may occur at a higher rate than an increase in pressure of the inlet gases within the HP intake duct 6b, due to increased power being supplied to the compressor 130, e.g. by the turbine 150. This may result in a change in the pressure difference between the first and second ends 12a, 12b of the HP EGR duct 12, which may affect, e.g. increase, the flow rate of EGR gases within the HP EGR duct.

Hence, when the driver requests an increase in the power supplied by the engine, the interaction between the operation of the turbocharger assembly 14 and the HP EGR system 160, may lead to an undesirable decrease in the power being provided by the engine 4.

The position of the HP EGR valve 162 may be controlled at least partially based on the pressure difference across the HP EGR duct 12, hence the HP EGR valve 162 may be controlled to compensate this effect. However, if the driver requests a rapid increase in power to be supplied by the engine, the HP EGR valve 162 may not be controlled quickly enough to sufficiently compensate for the change in pressure difference across the HP EGR duct 12.

Control unit 110 receives signals from the various sensors of FIG. 1 and employs the various actuators of FIG. 1 to adjust engine operation based on the received signals and instructions stored on a memory of the controller. In one example, the controller optimizes a boost loop and an EGR loop of the engine to control and coordinate emissions and enhance engine performance. To optimize the two loops, the control unit 110 provides for restricting a rate of change of exhaust manifold (EM) pressure (P3) to a level which can be correctly responded to, thereby reducing the disturbances to the boost loop. The control unit 110 may control the rate of change of EM pressure (P3) for a predetermined duration upon detecting a tip-in condition as the interaction between the gas control loops is highest during a tip-in condition. As used herein, a 'tip-in' condition may be understood to be a condition where torque requirements change rapidly, for instance, when a rate of change of driver demanded torque is greater than a threshold rate. The driver demanded torque may refer to torque requested by a driver to achieve a particular speed or acceleration. The driver demanded torque may correspond to various engine parameters, such as throttle angle. Further, the driver demanded torque may be determined based on inputs received from sensors, such as pedal position sensor, throttle sensor, or speed sensor.

Figure 2:
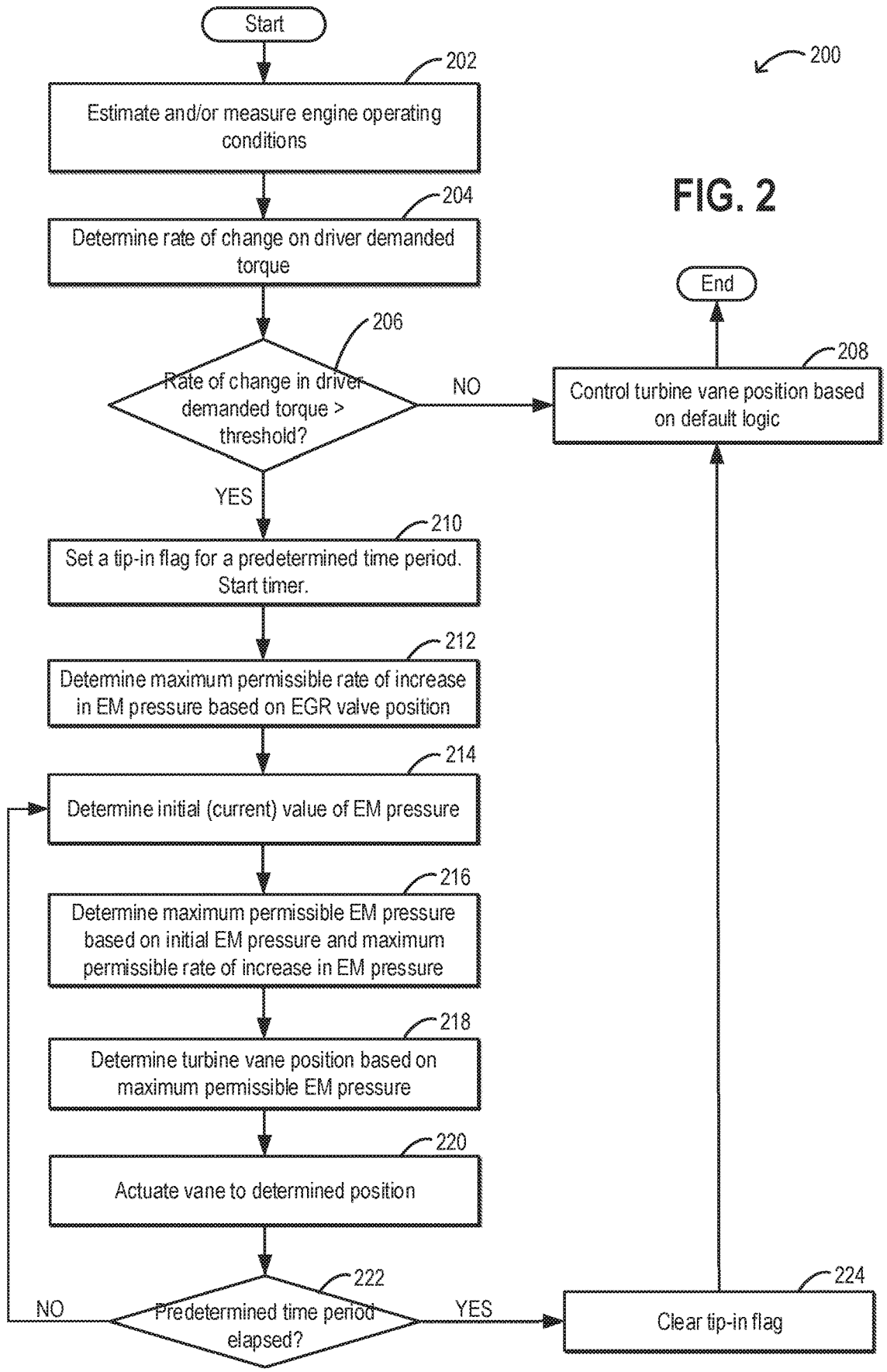
FIG. 2 shows an example method of operating an engine assembly according to the present disclosure.

As elaborated with reference to FIG. 2, based on inputs received from the sensors, the control unit 110 may determine the driver demanded torque. At steady state or very slowly changing conditions, nominal set points or default logic may be followed. The control unit 110 may detect a tip-in triggered by a change in a rate of driver demanded torque and then activate a method to limit the rate of change of EM pressure (P3) for a predetermined time period following the tip-in. Alternatively, the control method may be active at all times but would only have effect during rapidly changing conditions.

In response to detection of a tip-in event, the control unit 110 may set a tip-in flag active for a predetermined time period. It will be appreciated that the predetermined time period may be calibrated based on engine requirements such as actual engine torque relative to driver demanded torque. For example, as the difference between the actual engine torque and the driver demanded torque increases, the predetermined time period may be increased. The predetermined time period may be further based on one or more of engine speed, boost pressure, vehicle speed. For example, the predetermined time period may be higher at higher engine speeds or vehicle speeds relative to lower engine speeds and vehicle speeds. Further, the predetermined time period may be divided into multiple time steps, for example, each time step may be of one second, for managing the EM pressure (P3) in a controlled manner.

The control unit 110 may determine an initial EM pressure, upon detection of the tip-in. The initial EM pressure, in one example, may be a modeled value rather than a measured one. Thus, systems without EM pressure measurement may easily implement the mechanism described herein. The initial EM pressure may be determined based on a model including EM pressure as a function of turbine mass flow (dm_turbine), turbine vane angle, and the exhaust pressure downstream of the turbine (P4). However, in other implementations, the initial EM pressure may be measured too.

The control unit 110 may also determine an instantaneous position of the EGR valve 162 to compute a permissible rate of increase of EM pressure. As the positioning of the EGR valve 162 is typically controlled by the control unit 110, the information pertaining to positioning of the EGR valve 162 is available with the control unit 110. In an example, the control unit 110 may have EM pressure rate data, such as a look-up table, which may include a maximum rate of rise of EM pressure (P3) as a function of EGR valve position. The rate of increase of EM pressure (P3) may typically be calibrated such that the permitted rate of increase of exhaust pressure (P3) is high when the EGR valve is closed, but falls with increasingly larger EGR valve openings. Accordingly, when the EGR valve 162 is open, the rate of increase of EM pressure may be slow, but as the EGR valve 162 closes in response to the increase in the EM pressure, the permitted value for the rate of rise of the EM pressure will itself increase.

In one example, the calibration of the maximum permitted rate of EM pressure increase and the HP EGR valve position may be adjusted as a function of the maximum valve speed possible and the tolerable EGR mass flow error. For example, a speed at which the HP EGR valve can move may be determined (e.g., the valve may move at a speed of 1 degree of valve rotation per millisecond). In addition, the tolerable EGR mass flow error may be calculated (e.g., the tolerable EGR mass flow error may be an error in EGR fraction of 3%, which is then converted to an EGR mass flow error (in kg/hour)). Using an orifice flow equation and assuming the HP EGR valve is moved as fast as possible in the closed direction (if the EM pressure is increasing), the controller may determine that, in the next time step, the maximum EM pressure that is permissible can be provided without exceeding the tolerable EGR mass flow error. In other words, the controller may calculate how much of a pressure change can be compensated by moving the valve as fast as possible in one time step, based on the maximum valve speed and the orifice flow equation. As such, the orifice flow equation is non-linear. For example, closing the valve by 1 degree when it is wide open has a smaller effect on EGR flow while closing the valve by 1 degree when it is approaching the closed position has a larger effect on EGR flow, for a given pressure difference across the HP EGR duct. Therefore the tolerable pressure change varies non-linearly across the range of valve positions. Based on the initial value of the EM pressure (P3) and the rate of increase of the EM pressure, at each time step, a maximum allowable EM pressure may be computed. The maximum allowable pressure is indicative of an EM pressure (P3) to maintain a mass flow of the recirculated exhaust gas within a permissible limit. The maximum allowable EM pressure may be computed, for instance, for a subsequent time step. Thus, the maximum allowable EM pressure increases at each time step according to the maximum permitted rate.

Further, at each time step, a position of a vane(s) of the turbine 150 may be determined using the value of the maximum allowable EM pressure at that time step. As mentioned earlier, the EM pressure is a function of mass flow, downstream turbine pressure, and vane position. Here, this model may be an inverted turbine model and the maximum allowable EM pressure value computed above, the mass flow, and the downstream turbine pressure may be used to determine vane position. Thus, in the present case, the vane position is driven by the maximum allowable pressure and not the other way round, where the vane position determines the EM pressure.

Additionally, the control unit 110 may also determine a vane position, based on default logic, i.e., a logic, which may be independent of maximum allowable EM pressure. Further, the default value of the vane position may be compared with the vane position determined based on the maximum allowable EM pressure. Based on the comparison, a minimum of the two values of vane position may be selected as a final value of the vane position and the vane may be positioned accordingly. Consequently, resulting EM pressure (P3) may be within the tolerable range for satisfactory EGR control, automatically optimizing both loops.

As a result, when the EGR valve 160 is fully open, load rejection capability is poor, while when the EGR valve is closed, there may be no interaction between the two gas control loops and the EM pressure (P3) may be varied without any effect on the EGR loop.

In this way, the components of FIG. 1 enables an engine system comprising: an engine; a turbocharger including an intake compressor driven by an exhaust turbine; a high pressure exhaust gas recirculation (HP EGR) system including an HP EGR duct and an HP EGR valve for recirculating exhaust gas from upstream of the exhaust turbine to downstream of the intake compressor; a manifold air flow sensor coupled to an engine intake; and an engine controller including computer readable instructions stored on non-transitory memory for: determining an exhaust manifold (EM) pressure upstream of the turbine; estimating a maximum permitted rate of increase in EM pressure based on a position of the HP EGR valve; and adjusting operation of the turbine, including adjusting turbine geometry, to maintain a rate of increase in EM pressure at or below the maximum permitted rate of increase in EM pressure. The controller may include further instructions for: estimating a maximum EM pressure based on the maximum permitted rate of increase in EM pressure and an initial EM pressure, and wherein the adjusting operation of the turbine maintains the EM pressure, estimated upstream of the turbine, at or below the maximum EM pressure. In a further example, the controller may include further instructions for: estimating a mass flow rate of exhaust gases flowing through the turbine; and further adjusting operation of the turbine, including adjusting the turbine geometry, based on the mass flow rate of exhaust gases through the turbine. In one example, the turbine may be a variable geometry turbine having a turbine vane, wherein adjusting turbine geometry includes adjusting a turbine vane position, and wherein the initial EM pressure is measured via a sensor or modeled by the controller as a function of each of exhaust pressure downstream of the turbine, the mass flowrate of exhaust gases flowing through turbine, and an initial turbine vane position. The controller may include further instructions for performing each of the determining, estimating, and adjusting iteratively over each time step of a plurality of time steps, the plurality of time steps defining a predetermined duration since an operator requested increase in torque demand. In one example, estimating the maximum EM pressure based on the maximum permitted rate of increase in EM pressure and the initial EM pressure may include multiplying the maximum permitted rate of increase in EM pressure by a length of a given time step to calculate the maximum permitted increase in EM pressure for the given time step; and adding the maximum permitted increase in EM pressure to the initial EM pressure. The system may further comprise an exhaust waste-gate including a waste-gate valve, coupled across the exhaust turbine, and adjusting operation of the turbine may include adjusting an opening of the waste-gate valve to maintain the rate of increase in EM pressure at or below the maximum permitted rate of increase in EM pressure. The controller may include further instructions for varying a position of the HP EGR valve based on the adjusted operation of the turbine to maintain an exhaust flow rate through the HP EGR duct substantially constant from before the adjusted operation of the turbine.

Turning now to FIG. 2, a method to control high pressure exhaust gas recirculation (EGR) in a boosted internal combustion engine is shown. The order in which the method 200 is described is not intended to be construed as a limitation, and any number of the described method blocks can be combined in any appropriate order to execute the method 200 or an alternative method. Additionally, individual blocks may be deleted from the method 200 without departing from the spirit and scope of the subject matter described herein. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, adjusting EGR may include adjusting an actuator coupled to the HP EGR valve based on a measured or modeled exhaust manifold pressure so as to improve boost response. In one example, method 200 may be performed by programmed computing devices such as control unit 110.

At 202, method 200 includes estimating and/or measuring engine operating conditions. For example, details pertaining to torque parameters may be obtained. The torque parameters may include, for instance, pedal position, engine speed, throttle position, barometric pressure, engine load, boost pressure, etc. For example, an engine controller (such as control unit 110 of FIG. 1) may receive inputs pertaining to torque parameters from the various sensors. At 204, the method includes using the obtained torque parameters to determine a rate of change in driver demanded torque.

At 206, the method includes determining if there is an operator tip-in event where the operator is requesting an increase in torque demand. Further, the method includes determining whether the rate of increase of driver demanded torque is greater than a threshold rate. For instance, the controller may compare the determined rate of change of driver demanded torque at the tip-in with a threshold rate that is predefined and configurable. If the rate of change of driver demanded torque is less than the threshold rate, the method 200 may branch to (No' branch) block 208. In some examples, it may be further confirmed that the increase in operator torque demand is a tip-in where an HP EGR valve is at an actual position that is different from a desired or target position based on the operator torque demand. It will be appreciated that in still other examples, the method may proceed responsive to any operator tip-in event, independent of the HP EGR valve position or the rate of increase in torque demand.

At 208, the method includes controlling operation of the turbocharger, and thereby the exhaust manifold (EM) pressure (P3 of FIG. 1) based on a default logic. The default logic may include a logic which may be independent of a maximum allowable EM pressure wherein the vane position is not based on the maximum allowable EM pressure. In one example, controlling the turbocharger based on the default logic includes controlling the EM (P3 of FIG. 1) pressure based on the default logic.

As an example, the controller may determine a control signal to send to a turbine vane position actuator and/or the waste-gate valve, such as a signal indicative of a desired vane or waste-gate valve position, the signal determined based on a determination of driver demanded torque, independent of the EGR flow. The controller may determine a control signal to send to the vane position actuator or the waste-gate valve through a determination that directly takes into account the driver demanded torque, such as increasing the degree of closing of the vanes or the waste-gate valve as the driver demanded torque increases. The controller may determine the position signal based on a calculation using a look-up table with the input being driver torque demand and the output being the desired position. The routine then exits.

If at 206 it is determined that the rate of increase in driver demanded torque is in excess of the threshold rate, the method 200 may proceed to ('Yes' branch) 210. At 210, a tip-in flag may be set for a predetermined time period. In one example, this includes setting a timer. The predetermined time period may be correspond to a period over which the HP EGR valve is expected to respond. Further, the predetermined time period may be divided into multiple time steps or intervals, such as into intervals of one second.

At 212, a maximum permissible rate of increase of EM pressure may be determined, based on a position of the HP-EGR valve. In one example, the estimating is based on an absolute value of the high pressure EGR valve position. In an alternate example, the estimating may be based on a difference between an actual high pressure EGR valve position at the time of the increase in operator torque demand relative to a target high pressure EGR valve position based on the increase in operator torque demand.

The maximum permissible rate of increase of the EM pressure corresponds to a rate of pressure increase that ensures that the EM pressure is maintained within the tolerable limits. The maximum permitted rate of increase in pressure may be determined such that the HP EGR system (such as HP EGR system 160 of FIG. 1) can be controlled to adequately compensate for changes in pressure difference across the HP EGR duct (such as HP EGR duct 12), for example, by varying the position of an HP EGR valve to maintain the flow rate of recirculated exhaust gases within the HP EGR duct at a desirable level. In one example, the controller may receive an instantaneous value of the EGR valve position and may accordingly determine the maximum permissible rate of increase of the EM pressure. Additionally or alternatively, the method may comprise determining a maximum permitted value of pressure of the exhaust gases upstream of the turbine. The operation of the turbocharger assembly may then be controlled such that the pressure of exhaust gases upstream of the turbine is maintained at or below the maximum permitted value.

Figure 3:
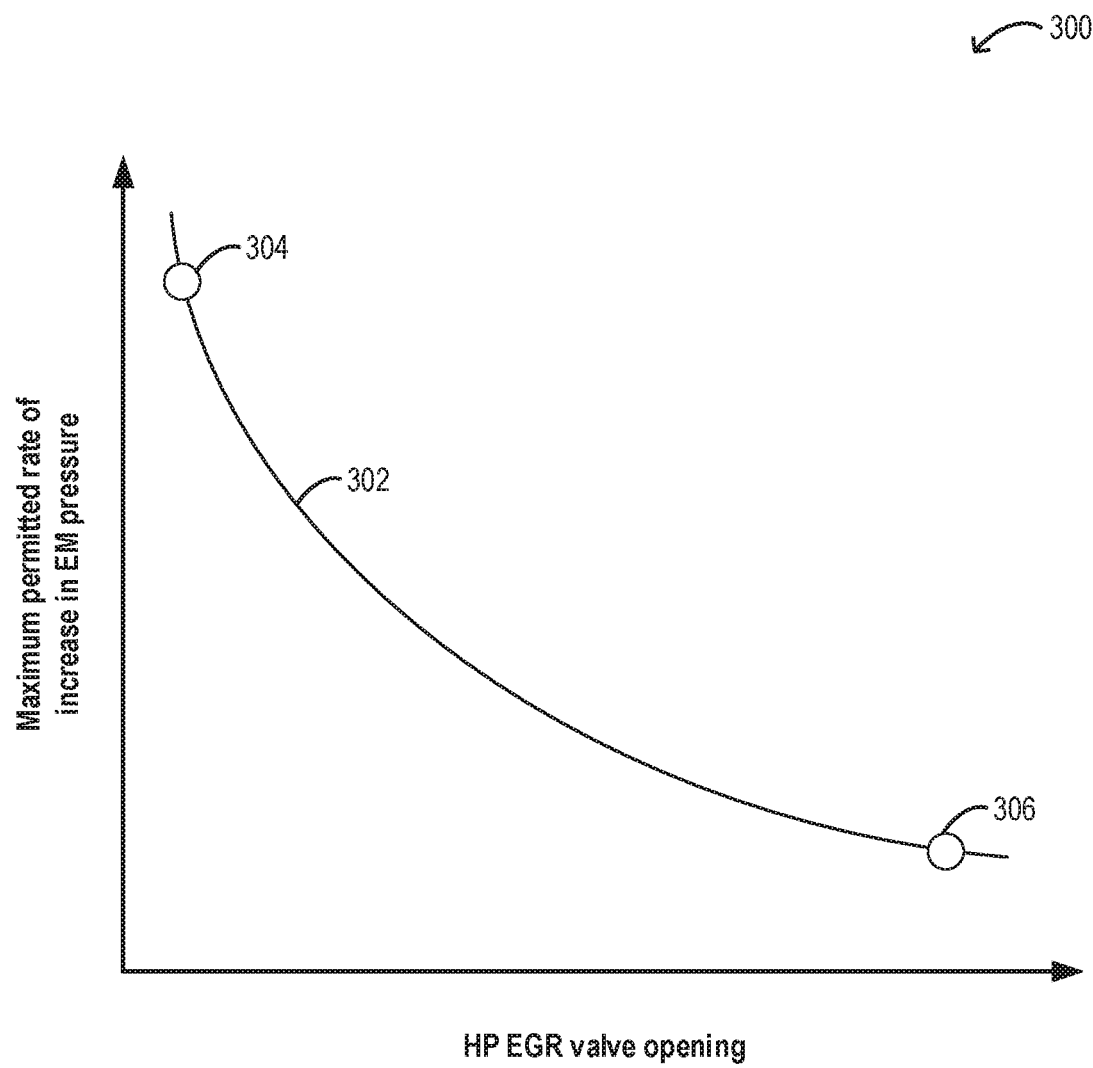
FIG. 3 shows an example relationship between HP-EGR valve position and a maximum permitted rate of EM pressure increase.

In one example, the controller may refer a map, such as the example map of FIG. 3, to determine the maximum permissible rate of increase of the EM pressure for a given EGR valve position. Transitioning temporarily to FIG. 3, map 300 shows an example relationship 302 between a maximum permissible rate of increase of EM pressure and an EGR valve position. As Herein the EGR valve position refers to the position of an HP EGR valve coupled in an HP EGR duct, and the maximum permissible rate of increase of EM pressure refers to a maximum allowed rate of increase in exhaust pressure upstream of an exhaust turbine, in a high pressure exhaust passage. As depicted herein, the relationship 302 between the maximum permissible rate of increase in EM pressure and HP EGR valve position is a non-linear inversely proportional relationship that is asymptotic at the ends. In particular, at smaller valve openings, such as at point 304 on map 300, there is choked flow through the HP EGR valve and the flow is largely insensitive to the pressure across the valve. In comparison, at larger valve openings, such as at point 306 on map 300, the flow is sensitive to the pressure across the valve, however, HP EGR valve movement has little effect on the flow. For example, closing the valve by 1 degree when it is wide open may have a smaller effect on EGR flow while closing the valve by 1 degree when it is approaching the closed position may have a larger effect on EGR flow, for a given pressure difference across the HP EGR duct. As a result, a tolerable pressure change during a transient may also vary non-linearly across the range of valve positions.

Returning to FIG. 2, the calibration of the maximum permitted rate of EM pressure increase relative to the HP EGR valve position may be adjusted as a function of the maximum valve speed possible and the tolerable EGR mass flow error. For example, a speed at which the HP EGR valve can move may be determined (e.g., the valve may move at a speed of 1 degree of valve rotation per millisecond). In addition, the tolerable EGR mass flow error may be calculated (e.g., the tolerable EGR mass flow error may be an error in EGR fraction of 3%, which is then converted to an EGR mass flow error (in kg/hour)). Using an orifice flow equation and assuming the HP EGR valve is moved as fast as possible in the closed direction (if the EM pressure is increasing), the controller may determine that the maximum EM pressure that is permissible can be provided without exceeding the tolerable EGR mass flow error. In other words, the controller may calculate how much of a pressure change can be compensated by moving the valve as fast as possible in one time step, based on the maximum valve speed and the orifice flow equation.

The effect of a change in the pressure of the exhaust gases within the HP exhaust duct (e.g., HP exhaust duct 9b of FIG. 1) relative to the pressure of the inlet gases within the HP intake duct (e.g., HP intake duct 6b of FIG. 1) on the flow rate of EGR gases within the HP EGR duct (such as HP EGR duct 12 of FIG. 1) may depend on the position of the HP EGR valve (e.g., HP EGR valve 162 of FIG. 1). The maximum permitted rate of increase in pressure and/or the maximum permitted value of pressure may be determined at least partially according to the position of the HP EGR valve. The maximum permitted rate of increase may be determined by referring to a data model or look-up table. For example, the maximum permitted rate of pressure increase may be determined by referring to a data model that provides the maximum permitted rate of pressure increase as a function of the position of the HP EGR valve according to equation (1), in which $\Delta P_{3max}$ is the maximum permitted rate of increase in pressure of exhaust gases upstream of the turbine.

$$\Delta P_{3max} = F_1(\text{EGR Valve Position}) \quad (1)$$

At 214, the method includes determining an initial or current value of the EM pressure. In one example, the initial EM pressure is based on the output of an exhaust pressure sensor. Alternatively, the initial EM pressure may be modeled, using a turbine model, based on exhaust pressure downstream the turbine (e.g., P4 of FIG. 1), a turbine mass flow, and a vane position of the turbine. For example, the initial value may be measured in real-time, based on value of exhaust pressure downstream the turbine (P4), the turbine mass flow, and a vane position of the turbine.

At 216, the method includes determining a maximum permissible value of EM pressure. The maximum allowable EM pressure may be calculated based on the maximum rate of increase of the EM pressure and the initial value of the EM pressure. In one example, the calculating is performed iteratively at each interval or time step of the predefined period. Thus, at each time step, the value of the maximum allowable EM pressure may increase.

At 218, using the maximum allowable EM pressure, a vane position may be determined. For instance, the vane position may be determined using the inverted turbine model, where the vane position is provided as a function of the maximum allowable EM pressure, an exhaust pressure downstream the turbine, and a rate of mass flow of the exhaust gases in the turbine.

Alternatively, a minimum of the vane position determined based on the maximum allowable EM pressure and a vane position determined based on the default logic is computed to determine a final vane position. Accordingly, at all times the vane position may be a lowest (most open) possible vane position. The low set-point of the turbine may be a more open position that gives a lower EM pressure. In this way, the maximum EM pressure that is calculated only comes into play if the set-point from the default logic would result in a higher EM pressure (with a vane position that is more closed). If the driver is not asking for a big increase in torque (or a rapid increase in torque), then the vane position limiting does not come into play.

At 220, vane(s) of the turbine may be actuated to the determined position to maintain EM pressure within an allowable limit. For instance, the controller may send a signal to the VGT to position the vanes of the turbine based on the determined vane position. As a result, the mass flow of EGR may be maintained within a permissible limit to ensure that the EM pressure does not go beyond the maximum allowable EM pressure determined earlier since the permissible limit of the mass flow of the EGR is based on the maximum EM pressure that is allowed.

At 222, it is determined if the predetermined time period has elapsed, such as based on the output of the timer. If not, the method returns to 214 to iteratively update the estimate of the initial pressure and thereafter the maximum allowable EM pressure and thereafter the position of the vanes. In one example, the maximum EM pressure determined on a given iteration may be used as the initial EM pressure on the immediately subsequent iteration. In particular, a previously determined maximum allowable pressure becomes the initial EM pressure for a current time step. Alternatively, a new value for the initial EM pressure may be determined on each iteration. The new value may correspond to a modeled value or may be measured in real time, as discussed at 214. If the predetermined time period has elapsed, the routine clears the tip-in flag at 224, and returns to controlling the VGT vane position based on the default logic at 208. Thus, the vane position after the expiration of the predetermined time period may be controlled based on the default logic.

In one example, determining the vane position based on the maximum permitted EM pressure may comprise determining a desirable geometry setting for the VGT, e.g. an angle of a variable vane of the VGT, and/or a desirable position for wastegate valve and setting the geometry of the VGT and/or the position of the wastegate valve according to the determined setting. The desirable setting may be determined by referring to a data model or look-up table. In one example, a data model is applied that allows the VGT geometry setting to be determined as a function of the maximum permitted value of pressure, the mass flow rate of exhaust gases through the turbine and the pressure downstream of the turbine, e.g. according to equation (2), in which $P_{3_{max}}$ is the maximum permitted value or pressure, ṁTurbine is the mass flow rate of exhaust gases through the turbine and P4 is the pressure of exhaust gases downstream of the turbine.

$$VGT = F_2(P_{3_{max}}, \dot{m}Turbine, P_4) \qquad (2)$$

In this way, the maximum permitted pressure value may be calculated by multiplying the maximum permitted rate of increase in pressure by the time step over which each iteration of the method is being performed, and adding the result to the initial exhaust pressure estimate.

As described above, the increase in pressure of the exhaust gases upstream of the turbine may result from a change in the flow area of exhaust gases flowing through and/or bypassing the turbine. The increase in pressure resulting from a particular change in flow area may depend on the mass flow rate of exhaust gases flowing through and/or bypassing the turbine. Hence, the method may further comprise determining a mass flow rate of exhaust gases passing through and/or bypassing the turbine. The operation of the turbine may be controlled at least partially according to the determined mass flow rate, e.g. in order to maintain the rate of increase in pressure of the exhaust gases upstream of the turbine at or below the maximum permitted rate.

The mass flow rate of exhaust gases flowing through the turbine may depend on the pressure of exhaust gases downstream of the turbine. As shown in FIG. 1, the engine assembly may further comprise a Low Pressure (LP) EGR system and the position of the LP EGR valve may therefore affect the mass flow rate of exhaust gases through the turbine. In particular, since EGR that has been through the LP EGR route has given up more exhaust energy to the turbine (as compared to the EGR via the HP EGR route), LP EGR provides an efficiency benefit. Thus, in addition to adjusting the position of the vanes, a position of the LP EGR valve may also be adjusted responsive to the increase in driver demanded torque to limit the EM pressure.

In one example, the split ratio of total EGR between the low pressure and high pressure routes may be varied to achieve an exhaust NOx target. Further, LP EGR flow may be reduced (by reducing the opening of the LP EGR valve) to compensate for an increased HP EGR flow when the EM pressure increases as the vanes move to the more closed position. However, due to the exhaust gas flow path to the engine being significantly longer for LP EGR than for HP EGR, their response times are different. Also, the pressure gradient across the LP EGR system is significantly lower than that for the HP EGR system. Consequently, to compensate for fast changing VGT vane positions and HP EGR flow using slow changing, further away LP EGR flow, LP-EGR may be treated as a slow changing 'noise factor' to the VGT and HP-EGR control, the latter being more 'busy' during transients. Further still, since the operation of exhaust after-treatment devices may affect the mass flow rate of exhaust gases through the exhaust system, and hence, through the turbine, in addition to adjusting the position of the vanes, exhaust after-treatment device operation is adjusted responsive to the increase in driver demanded torque to limit the EM pressure. For example, following a period of operation of the exhaust after-treatment devices, the performance of the devices may be reduced. For example, the particulate filter and/or the lean NOx trap may become full, reducing the rate at which they are able to remove polluting substances from the exhaust gases. As the performance of the exhaust after-treatment devices reduces, the mass flow rate of exhaust gases through the exhaust after-treatment devices and/or the difference in pressure across the exhaust after-treatment devices may vary. The operation of the exhaust after-treatment devices may therefore affect the mass flow rate of exhaust gases through the turbine as well as the pressure of the exhaust gases downstream, e.g. immediately downstream, of the turbine. These factors may in turn affect the EM pressure estimated upstream of the turbine. For example, responsive to a transient increase in torque demand due to a tip-in, an exhaust after-treatment device regeneration or purge event may be aborted. This is because the effect of the after-treatment devices (e.g. filter blocking) are slow changing and the actions taken in response (e.g. filter regeneration or NOx trap purge) take several minutes to complete.

In this way, by determining the pressure of exhaust gasses upstream of the turbine and/or the mass flow rate of exhaust gases through the turbine, a turbocharger assembly may be controlled more accurately to reduce undesirable increases in the flow rate of exhaust gases through an HP EGR duct. As a result, undesirable decreases in the power being provided by an engine are reduced.

It will be appreciated that the iterative process of the method of FIG. 2 may optionally be performed continuously, e.g. in a continuous loop, during operation of the vehicle. In other words, the iterative process may be performed whether or not the driver of the vehicle, the engine controller, or another controller of the vehicle has requested an increase in torque to be provided. For example, the method may be triggered when any request for an increased amount of torque to be supplied by the engine is detected.

Figure 4:
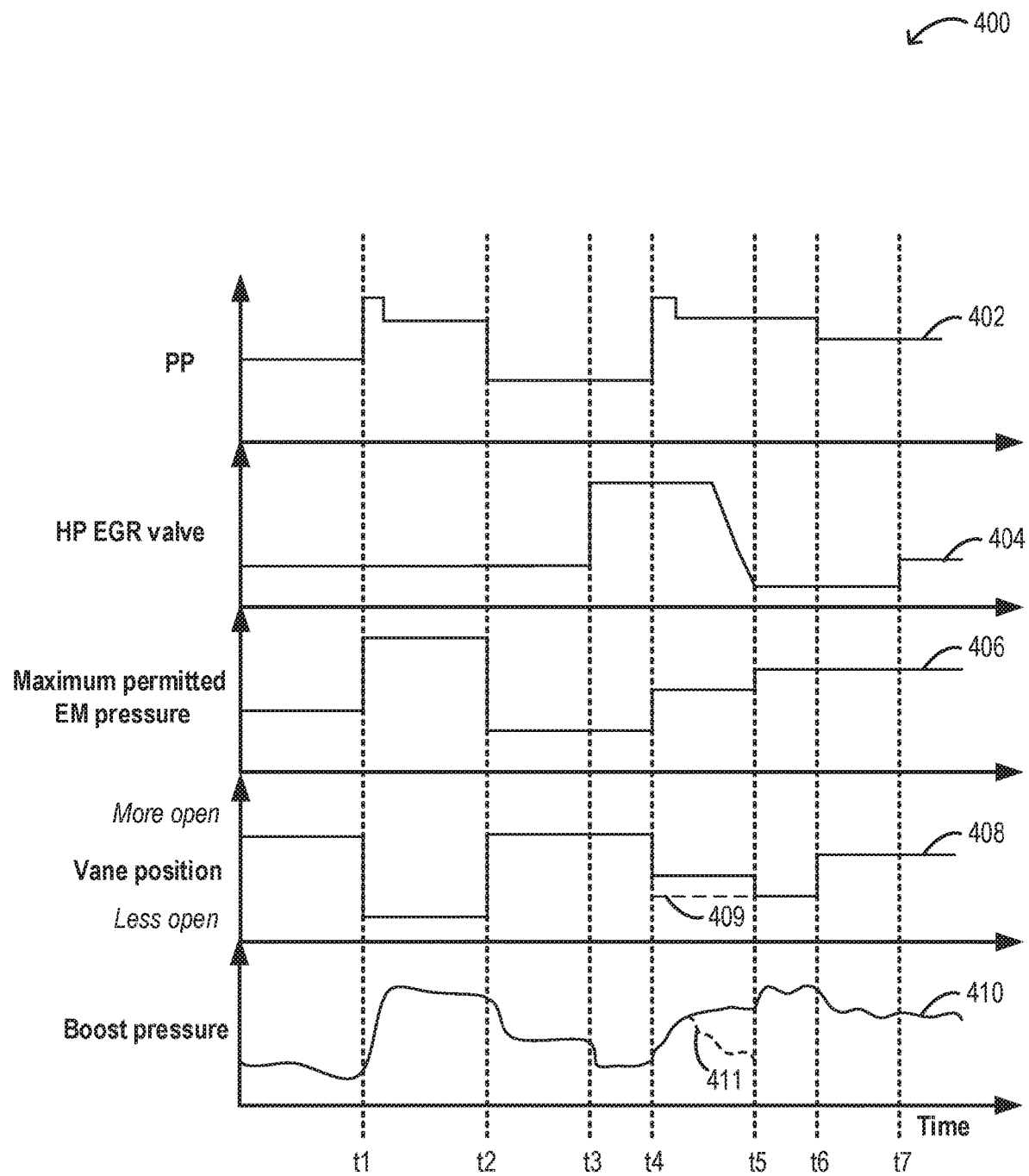
FIG. 4 shows a prophetic example engine operation for coordinating EGR and boost control loops.

Turning now to FIG. 4, an example engine operation coordinating HP EGR loop and boost loop controls is shown. Map 400 depicts operator torque demand via a pedal position (PP) at plot 402, the position of an HP EGR valve coupled in an HP EGR duct at plot 404, a maximum permitted exhaust manifold (EM) pressure upstream of an exhaust turbine at plot 406, a turbine vane position at plot 408, and boost pressure at a turbocharger compressor at plot 410.

The maximum permitted EM pressure upstream of the exhaust turbine is determined as a function of a maximum permitted rate of increase in EM pressure, which is in turn determined as a function of HP EGR valve position.

Prior to t1, the engine is operated with some boost pressure (plot 410) in accordance with the lower operator torque demand (plot 402). The lower level of boost pressure is provided by maintaining the turbine vanes of the turbocharger more open (plot 408). The engine is also operating with a reduced amount of HP EGR as indicated by the smaller opening of the HP EGR valve (plot 404).

At t1, there is a rapid increase in operator torque demand due to a tip-in event. Responsive to the increased operator torque demand, a maximum permitted EM pressure is determined. In particular, due to the more closed position of the HP EGR valve at the time of the tip-in, a higher rate of increase in EM pressure is permitted, thereby allowing for a higher maximum permitted EM pressure. In particular, due to the more closed position of the HP EGR valve, the boost loop is less likely to be adversely affected by the HG EGR loop and therefore EM pressure is allowed to be increased to a higher level. The increase in EM pressure is achieved by moving the vanes to a more closed position, allowing for boost pressure to be rapidly increased. At t2, once the torque demand decreases, the vane position is returned to a more open position with a corresponding drop in boost pressure.

At t3, there is a change in engine operating conditions resulting in an increase in the demand for HP EGR. This is met by moving the HP EGR valve to a more open position. At t4, there is another rapid increase in operator torque demand due to another tip-in event. Responsive to the increased operator torque demand, the maximum permitted EM pressure is determined. In particular, due to the more open position of the HP EGR valve at the time of the tip-in, a relatively lower rate of increase in EM pressure is permitted (as compared to the rate permitted at t1), thereby allowing for a lower maximum permitted EM pressure (as compared to the EM pressure permitted at t1). In particular, due to the more open position of the HP EGR valve, the boost loop is more likely to be adversely affected by the HG EGR loop and therefore EM pressure is allowed to be increased to a lower level. The smaller increase in EM pressure is achieved by moving the vanes to a less closed position and holding the vanes less closed for a duration from t4 to t5. This duration corresponds to a duration over which the HP EGR valve is gradually moved to a more closed position to reduce the effect that the HP EGR loop can have on the boost loop. In particular, between t4 and t5, a position of the HP EGR valve is adjusted based on the adjustments to the vane position, and the maximum permitted EM pressure increase so as to maintain an exhaust flow rate through the HP EGR duct substantially constant from before the adjusted operation of the turbine. That is, HP EGR flow may be maintained from before t4, through t5, and after, by adjusting the HP EGR valve in coordination to adjustments to the vane position. This is because as the vane position moves to a more closed position, and the EM pressure increases, the pressure difference across the EGR duct increases. If the HP EGR valve's position were maintained, this increase in pressure difference would result in a rise in HP EGR flow into the intake manifold, degrading engine performance. Instead, by adjusting the HP EGR valve position in coordination with the vane position adjustments, the EGR flow is maintained even as the pressure upstream of an inlet of the HP EGR duct increases.

As a result of the vane and EGR valve position adjustments, between t4 and t5, boost pressure starts to increase gradually. At t5, once the HP EGR valve has been moved to a more closed position, where the effect of the EGR loop on the boost loop is reduced, the vanes are moved to a more closed position. As a result, after t5, boost pressure starts to increase more rapidly to a boost level that meets the operator torque demand. It will be appreciated that if the vanes were moved to the more closed position directly at t4 responsive to the increased operator torque demand (as indicated by dashed segment 409), while the HP EGR valve remained at its more open position, EGR would be received in the intake passage reducing engine torque output and reducing compressor boost pressure (as indicated by dashed segment 411).

At t6, once the torque demand decreases, the vane position is returned to a more open position with a corresponding drop in boost pressure. At t7, there is a change in engine operating conditions resulting in an increase in the demand for HP EGR. This is met by moving the HP EGR valve to a more open position.

In this way, a vane position of a turbine may be changed in a controlled manner during rapidly changing conditions such that disturbances to both of an exhaust gas control loop and a boost control loop is minimized and the performance of both the loops is also optimized. The technical effect of controlling a turbine vane position based on a maximum allowable EM pressure is that only a restricted portion of the exhaust gases is allowed in the intake manifold. Consequently, the EM pressure can be maintained within a permissible limit to avoid any negative impact on the boost loop, and thus the performance of the engine. By concurrently adjusting an HP EGR valve position as vane position and exhaust pressure upstream of the turbine changes, EGR flow may be maintained while boost pressure increases, improving boosted engine performance.

One example method for a turbocharged engine comprises: estimating a maximum allowable rate of increase of exhaust manifold (EM) pressure based on a position of an exhaust gas recirculation (EGR) valve; estimating a maximum allowable EM pressure based on the maximum allowable rate of increase of EM pressure; and adjusting a vane position of an exhaust turbine based on the maximum allowable EM pressure. In the preceding example, the method additionally or optionally further comprises estimating an initial value of the EM pressure based on each of an exhaust pressure downstream of the exhaust turbine, a turbine mass flow, and an initial vane position, wherein the maximum allowable EM pressure is further based on the initial value of the EM pressure. In any or all of the preceding examples, additionally or optionally, the estimating the maximum allowable rate of increase of EM pressure, the estimating the maximum allowable EM pressure, and the adjusting the vane position is performed for a predetermined time period responsive to an estimated rate of change of driver demanded torque being greater than a threshold rate, wherein the increase in exhaust manifold pressure is estimated based on the position of the EGR valve via a non-linear inversely proportional function having asymptotic ends. In any or all of the preceding examples, the method additionally or optionally further comprises adjusting the position of the EGR valve based on the maximum allowable EM pressure and the vane position when the estimated rate of change of driver demanded torque is greater than the threshold rate to maintain an EGR flow rate while the vane position is adjusted. In any or all of the preceding examples, additionally or optionally the adjusting the vane position includes determining a final vane position via an inverted turbine model as a function of the maximum allowable EM pressure, an exhaust pressure downstream the turbine, and a rate of mass flow of the exhaust gases through the turbine. In any or all of the preceding examples, additionally or optionally, adjusting the vane position further includes: computing a default vane position independent of the maximum allowable EM pressure; selecting a minimum of the final vane position based on the maximum allowable EM pressure and the default vane position; and positioning the vane according to the selecting. In any or all of the preceding examples, additionally or optionally, the EGR valve is a high pressure EGR valve coupled in a high pressure EGR passage recirculating exhaust gas from upstream of the exhaust turbine to downstream of an intake compressor, and wherein the adjusting the vane position maintains the EM pressure estimated upstream of the exhaust turbine and at an inlet of the high pressure EGR passage at or below the maximum allowable EM pressure. In any or all of the preceding examples, the method additionally or optionally further comprises adjusting a position of a low pressure EGR valve coupled in a low pressure EGR passage recirculating exhaust gas from downstream of the exhaust turbine to upstream of an intake compressor based on the adjusted vane position.

Another example engine system comprises: an engine; a turbocharger including an intake compressor driven by an exhaust turbine; a high pressure exhaust gas recirculation (HP EGR) system including an HP EGR duct and an HP EGR valve for recirculating exhaust gas from upstream of the exhaust turbine to downstream of the intake compressor; a manifold air flow sensor coupled to an engine intake; and an engine controller including computer readable instructions stored on non-transitory memory for: determining an exhaust manifold (EM) pressure upstream of the turbine; estimating a maximum permitted rate of increase in EM pressure based on a position of the HP EGR valve; and adjusting operation of the turbine, including adjusting turbine geometry, to maintain a rate of increase in EM pressure at or below the maximum permitted rate of increase in EM pressure. In the preceding example, additionally or optionally, the estimating is based on a non-linear inversely proportional function with asymptotic ends between the maximum permitted rate of increase in EM pressure and the position of the HP EGR valve, and wherein the controller includes further instructions for: estimating a maximum EM pressure based on the maximum permitted rate of increase in EM pressure and an initial EM pressure, and wherein the adjusting operation of the turbine maintains the EM pressure, estimated upstream of the turbine, at or below the maximum EM pressure. In any or all of the preceding examples, additionally or optionally, the controller includes further instructions for: estimating a mass flow rate of exhaust gases flowing through the turbine; and further adjusting operation of the turbine, including adjusting the turbine geometry, based on the mass flow rate of exhaust gases through the turbine. In any or all of the preceding examples, additionally or optionally, the turbine is a variable geometry turbine having a turbine vane, wherein adjusting turbine geometry includes adjusting a turbine vane position, and wherein the initial EM pressure is measured via a sensor or modeled by the controller as a function of each of exhaust pressure downstream of the turbine, the mass flowrate of exhaust gases flowing through turbine, and an initial turbine vane position. In any or all of the preceding examples, additionally or optionally, the controller includes further instructions for performing each of the determining, estimating, and adjusting iteratively over each time step of a plurality of time steps, responsive to an operator increase in torque demand where an actual position of the HP EGR valve is different from a target position of the HP EGR valve, the plurality of time steps defining a predetermined duration since the operator requested increase in torque demand, the target position of the HP EGR valve based on the operator requested increase in torque demand. In any or all of the preceding examples, additionally or optionally, estimating the maximum EM pressure based on the maximum permitted rate of increase in EM pressure and the initial EM pressure includes: multiplying the maximum permitted rate of increase in EM pressure by a length of a given time step to calculate the maximum permitted increase in EM pressure for the given time step; and adding the maximum permitted increase in EM pressure to the initial EM pressure. In any or all of the preceding examples, additionally or optionally, the system further comprises an exhaust waste-gate including a waste-gate valve, coupled across the exhaust turbine, and wherein adjusting operation of the turbine includes adjusting an opening of the waste-gate valve to maintain the rate of increase in EM pressure at or below the maximum permitted rate of increase in EM pressure. In any or all of the preceding examples, additionally or optionally, the controller includes further instructions for: varying a position of the HP EGR valve based on the adjusted operation of the turbine to maintain an exhaust flow rate through the HP EGR duct substantially constant from before the adjusted operation of the turbine.

Another example method for a turbocharged engine comprises responsive to an increase in operator torque demand, estimating a maximum permitted rate of increase in exhaust pressure upstream of a variable geometry exhaust turbine based on a high pressure EGR valve position; and adjusting a vane position of the turbine based on the maximum permitted rate of increase to maintain the exhaust pressure upstream of the turbine at or below a threshold pressure. In the preceding example, additionally or optionally, the estimating based on the high pressure EGR valve position includes estimating based on a difference between an actual high pressure EGR valve position relative to a target high pressure EGR valve position, the target high pressure EGR valve position based on the increase in operator torque demand. In any or all of the preceding examples, the method additionally or optionally further comprises modeling, via an inverse turbine model, an initial exhaust pressure upstream of the exhaust turbine at a time of the increase in operator torque demand as a function of each of a turbine mass flow, an exhaust pressure downstream of the exhaust turbine, and an initial vane position at the time of the increase in operator torque demand, and wherein the threshold pressure is based on each of the maximum permitted rate of increase in exhaust pressure upstream and the modeled initial exhaust pressure. In any or all of the preceding examples, the method additionally or optionally further comprises adjusting an opening of an exhaust waste-gate valve coupled across the turbine based on the maximum permitted rate of increase and the adjusted vane position to maintain the exhaust pressure upstream of the turbine at or below the threshold pressure. In any or all of the preceding examples, the method additionally or optionally further comprises, while adjusting the vane position, adjusting the high pressure EGR valve position based on the adjusted vane position to maintain an EGR flow rate through the high pressure valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
   an engine;
   a turbocharger including an intake compressor driven by an exhaust turbine;
   a high pressure exhaust gas recirculation (HP EGR) system including an HP EGR duct and an HP EGR valve for recirculating exhaust gas from upstream of the exhaust turbine to downstream of the intake compressor;
   a manifold air flow sensor coupled to an engine intake; and
   an engine controller including computer readable instructions stored on non-transitory memory for:
      determining an exhaust manifold (EM) pressure upstream of the exhaust turbine;
      estimating a maximum permitted rate of increase in EM pressure based on a position of the HP EGR valve; and
      adjusting operation of the exhaust turbine, including adjusting turbine geometry, to maintain a rate of increase in EM pressure at or below the maximum permitted rate of increase in EM pressure.

2. The engine system of claim 1, further comprising an exhaust waste-gate including a waste-gate valve, coupled across the exhaust turbine, and wherein adjusting operation of the exhaust turbine includes adjusting an opening of the waste-gate valve to maintain the rate of increase in EM pressure at or below the maximum permitted rate of increase in EM pressure.

3. The engine system of claim 1, wherein the controller includes further computer readable instructions for:
   varying a position of the HP EGR valve based on the adjusted operation of the exhaust turbine to maintain an exhaust flow rate through the HP EGR duct substantially constant from before the adjusted operation of the turbine.

4. The engine system of claim 1, wherein the steps of determining the EM pressure, estimating the maximum permitted rate of increase in EM pressure, and adjusting operation of the exhaust turbine are triggered in response to a request for increased engine torque.

5. The engine system of claim 1, wherein the maximum permitted rate of increase in EM pressure is determined based on a data model.

6. The engine system of claim 1, wherein the estimating is based on a non-linear inversely proportional function with asymptotic ends between the maximum permitted rate of increase in EM pressure and the position of the HP EGR valve, and wherein the engine controller includes further computer readable instructions for:
   estimating a maximum EM pressure based on the maximum permitted rate of increase in EM pressure and an initial EM pressure, and wherein the adjusting operation of the exhaust turbine maintains the EM pressure, estimated upstream of the exhaust turbine, at or below the maximum EM pressure.

7. The engine system of claim 6, wherein the engine controller includes further computer readable instructions for:
   estimating a mass flow rate of exhaust gases flowing through the exhaust turbine; and
   further adjusting operation of the exhaust turbine, including adjusting the exhaust turbine geometry, based on the mass flow rate of exhaust gases through the exhaust turbine.

8. The engine system of claim 7, wherein the exhaust turbine is a variable geometry turbine having a turbine vane, wherein adjusting turbine geometry includes adjusting a turbine vane position, and wherein the initial EM pressure is measured via a sensor or modeled by the engine controller as a function of each of exhaust pressure downstream of the exhaust turbine, the mass flowrate of exhaust gases flowing through the exhaust turbine, and an initial turbine vane position.

9. The engine system of claim 6, wherein the engine controller includes further computer readable instructions for performing each of the determining, estimating, and adjusting iteratively over each time step of a plurality of time steps, responsive to an operator increase in torque demand where an actual position of the HP EGR valve is different from a target position of the HP EGR valve, the plurality of time steps defining a predetermined duration since the operator requested increase in torque demand, the target position of the HP EGR valve based on the operator requested increase in torque demand.

10. The engine system of claim 9, wherein estimating the maximum EM pressure based on the maximum permitted rate of increase in the EM pressure and the initial EM pressure includes:
    multiplying the maximum permitted rate of increase in EM pressure by a length of a given time step to calculate the maximum permitted increase in EM pressure for the given time step; and
    adding the maximum permitted increase in EM pressure to the initial EM pressure.

11. The engine system of claim 1, further comprising:
    a lower pressure (LP) EGR system including an LP EGR duct and an LP EGR valve for recirculating exhaust gas from downstream of the exhaust turbine to upstream of the intake compressor.

12. The engine system of claim 11, wherein the controller includes further computer readable instructions for:
    adjusting a position of the LP EGR valve to maintain the rate of increase in EM pressure at or below the maximum rate of increase in EM pressure.

13. The engine system of claim 12, wherein the controller includes further computer readable instructions for:
    varying a split ratio of a total EGR between the LP EGR system and the HP EGR system to achieve an exhaust NOx target.

14. The engine system of claim 12, wherein the controller includes further computer readable instructions for:
reducing flow through the LP EGR system to compensate for an increase in HP EGR flow.

15. An engine system, comprising:
an engine;
a turbocharger including an intake compressor driven by an exhaust turbine having a turbine vane;
a high pressure exhaust gas recirculation (HP EGR) system including an HP EGR duct and an HP EGR valve for recirculating exhaust gas from upstream of the exhaust turbine to downstream of the intake compressor;
a manifold air flow sensor coupled to an engine intake;
an exhaust waste-gate including a waste-gate valve, coupled across the exhaust turbine; and
an engine controller including computer readable instructions stored on non-transitory memory for:
determining an exhaust manifold (EM) pressure upstream of the exhaust turbine;
estimating a maximum permitted rate of increase in EM pressure based on a position of the HP EGR valve; and
adjusting operation of the exhaust turbine, including adjusting turbine geometry and/or adjusting the waste-gate valve, to maintain a rate of increase in EM pressure at or below the maximum permitted rate of increase in EM pressure.

16. The engine system of claim 15, wherein the controller includes further computer readable instructions for:
estimating an initial value of the EM pressure based on each of an exhaust pressure downstream of the exhaust turbine, a turbine mass flow, and an initial vane position, and wherein the maximum permitted rate of increase in EM pressure is further based on the initial value of the EM pressure.

17. The engine system of claim 15, wherein the adjusting the turbine geometry includes determining a final vane position via an inverted turbine model as a function of the maximum permitted rate of increased in EM pressure, an exhaust pressure downstream the turbine, and a rate of mass flow of the exhaust gases through the exhaust turbine.

18. The engine system of claim 17, wherein adjusting the turbine geometry further includes:
computing a default vane position independent of the maximum permitted rate of increase in EM pressure;
selecting a minimum of the final vane position based on the maximum permitted rate of increase in EM pressure and the default vane position; and
positioning the turbine vane according to the selecting.

19. The engine system of claim 15, wherein the steps of determining the EM pressure, estimating the maximum permitted rate of increase in EM pressure, and adjusting operation of the exhaust turbine are triggered in response to an increase in operator torque demand.

20. The engine system of claim 19, wherein the engine controller includes further computer readable instructions for:
modeling, via an inverse turbine model, an initial exhaust pressure upstream of the exhaust turbine at a time of the increase in operator torque demand as a function of each of a turbine mass flow, an exhaust pressure downstream of the exhaust turbine, and an initial vane position at the time of the increase in operator torque demand;
wherein the threshold pressure is based on each of the maximum permitted rate of increase in EM pressure and the modeled initial exhaust pressure.

* * * * *